US012804605B2

(12) United States Patent
Li

(10) Patent No.: US 12,804,605 B2
(45) Date of Patent: Nov. 17, 2026

(54) PAGING INDICATION BIT DETERMINATION METHOD AND APPARATUS, AND COMMUNICATION DEVICE AND STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 233 days.

(21) Appl. No.: 18/727,322

(22) PCT Filed: Jan. 10, 2022

(86) PCT No.: PCT/CN2022/071131
§ 371 (c)(1),
(2) Date: Jul. 8, 2024

(87) PCT Pub. No.: WO2023/130477
PCT Pub. Date: Jul. 13, 2023

(65) Prior Publication Data
US 2025/0097899 A1 Mar. 20, 2025

(51) Int. Cl.
*H04W 68/02* (2009.01)

(52) U.S. Cl.
CPC .................................. *H04W 68/02* (2013.01)

(58) Field of Classification Search
CPC . H04W 68/02; H04W 68/025; H04W 68/005; H04W 68/00; H04W 68/04; H04W 68/06; H04W 68/08; H04W 74/002; H04W 68/12; H04W 68/10
See application file for complete search history.

(56) References Cited

U.S. PATENT DOCUMENTS

2024/0057034 A1* 2/2024 Shrivastava .......... H04W 68/02
2024/0292373 A1* 8/2024 Zhou ..................... H04W 68/02
2024/0381318 A1* 11/2024 Laselva ................. H04W 68/02

FOREIGN PATENT DOCUMENTS

CN 111345081 A 6/2020
CN 113170282 A 7/2021
CN 113170282 B * 11/2023 .............. H04W 4/08

OTHER PUBLICATIONS

3GPP TSG RAN WG1 #104-e—R1-2100394 e-Meeting, Jan. 25 â Feb. 5, 2021 (Year: 2021).*
3GPP TSG RAN WG1 #106-e—R1-2107414—e-Meeting, Aug. 16 â 27, 2021 (Year: 2021).*
CN 115669196 A Jan. 2023.*
European Patent Application No. 22917947.8 Search Report dated Feb. 17, 2025, 11 pages.

(Continued)

*Primary Examiner* — Nizar N Sivji
(74) *Attorney, Agent, or Firm* — Cozen O'Connor

(57) ABSTRACT

A method for determining a paging indication bit, performed by a user equipment (UE) includes: determining, according to a paging group identifier (ID) of the UE, a paging indication bit index of a paging indication bit corresponding to the paging group ID of the UE in a paging earlier indication (PEI); and decoding the paging indication bit corresponding to the paging group ID of the UE in the PEI according to the paging indication bit index.

9 Claims, 4 Drawing Sheets

(56) References Cited

OTHER PUBLICATIONS

Xiaomi Communications, "Summary of [Post115-e][089][ePowSav] Paging Subgrouping", 3GPP TSG-RAN WG2 Meeting #116 electronic, R2-2109647, Nov. 2021, 45 pages.
PCT/CN2022/071131 International Search Report and Written Opinion dated Oct. 8, 2022, 7 pages.
PCT/CN2022/071131 English translation of International Search Report and Written Opinion dated Oct. 8, 2022, 6 pages.
Chinese Patent Application No. 202280000152.4, First Office Action dated Jan. 11, 2024, 4 pages.
Chinese Patent Application No. 202280000152.4, English translation of First Office Action dated Jan. 11, 2024, 5 pages.
Chinese Patent Application No. 202280000152.4, Second Office Action dated May 17, 2024, 4 pages.
Chinese Patent Application No. 202280000152.4, English translation of Second Office Action dated May 17, 2024, 5 pages.
Huawei et al. "Paging enhancements for UE power saving in IDLE/inactive mode" 3GPP TSG RAN WG1 Meeting #106bis, R1-2108744 Oct. 2021, 12 pages.
CMCC "Discussion on paging early indication design" 3GPP TSG RAN WG1 #106-e R1-2107414, Aug. 2021, 5 pages.

* cited by examiner

PAGING INDICATION BIT DETERMINATION METHOD AND APPARATUS, AND COMMUNICATION DEVICE AND STORAGE MEDIUM

CROSS REFERENCE TO RELATED APPLICATIONS

This application is a U.S. national phase of International Application No. PCT/CN2022/071131, filed on Jan. 10, 2022, the entire contents of which are incorporated herein by reference.

TECHNICAL FIELD

The disclosure relates to but is not limited to a field of wireless communication technologies, and more particularly, to a method for determining a paging indication bit, an apparatus for determining a paging indication bit, a communication device and a storage medium.

BACKGROUND

At a paging occasion (PO), all user equipments (UEs) are woken up to monitor a paging message. Since paging probabilities of respective UEs are different, excess power loss may occur due to frequent wakeups of UEs that are not paged. Therefore, a base station may send a paging early indication (PEI) to instruct a UE regarding whether the UE needs to be woken up within the PO and monitor the paging message.

SUMMARY

According to a first aspect of embodiments of the disclosure, a method for determining a paging indication bit, performed by a user equipment (UE), is provided. The method includes:

- determining, according to a paging group identifier (ID) of the UE, a paging indication bit index of a paging indication bit corresponding to the paging group ID of the UE in a paging early indication (PEI); and
- decoding the paging indication bit corresponding to the paging group ID of the UE in the PEI according to the paging indication bit index.

According to a second aspect of embodiments of the disclosure, a method for determining a paging indication bit, performed by a base station, is provided. The method includes:

- determining, according to a paging group identifier (ID) of a user equipment (UE) for which paging indication is to be performed, a paging indication bit index of a paging indication bit corresponding to the paging group ID of the UE; and
- determining the paging indication bit corresponding to the paging group ID of the UE in a paging early indication (PEI) according to the paging indication bit index.

According to a third aspect of embodiments of the disclosure, a communication device is provided. The device includes: a processor, a memory and an executable program stored on the memory and executable by the processor. When the executable program is executed by the processor, the steps of the method for determining a paging indication bit of the first aspect or the second aspect are implemented.

According to a fourth aspect of embodiments of the disclosure, a storage medium having an executable program stored thereon is provided. When the executable program is executed by a processor, the steps of the method for determining a paging indication bit of the first aspect or the second aspect are implemented.

It should be understood that the above general description and the following detailed descriptions are exemplary and explanatory only and do not limit the embodiments of the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the embodiments of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with embodiments of the disclosure. Instead, they are merely examples of apparatuses and methods consistent with aspects related to embodiments of the disclosure as recited in the appended claims.

The terms used in embodiments of the disclosure are only for the purpose of describing specific embodiments, and are not intended to limit embodiments of the disclosure. The singular forms of “a” and “the” used in the disclosure and appended claims are also intended to include plural forms, unless the context clearly indicates other meanings. It is understandable that the term "and/or" as used herein refers to and includes any or all possible combinations of one or more associated listed items.

It is understandable that although the terms "first", "second", and "third" may be used in embodiments of the disclosure to describe various information, the information should not be limited to these terms. These terms are only used to distinguish the same type of information from each other. For example, without departing from the scope of embodiments of the disclosure, the first information may also be referred to as the second information, and similarly, the second information may also be referred to as the first information. Depending on the context, the term "if" as used herein may be interpreted as "when", "while" or "in response to determining".

Figure 1:
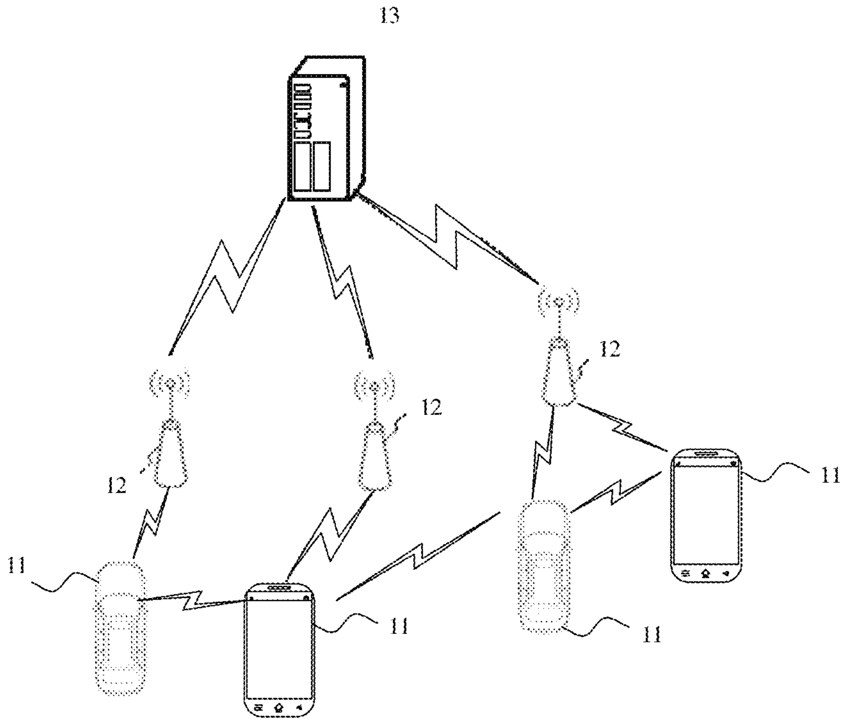
FIG. 1 is a structural diagram illustrating a wireless communication system according to an exemplary embodiment.

FIG. 1 is a schematic diagram illustrating a wireless communication system according to an embodiment. As illustrated in FIG. 1, the wireless communication system is a communication system based on cellular mobile communication technology. The wireless communication system may include: a plurality of terminals 11 and a plurality of base stations 12.

The terminal 11 may be a device that provides voice and/or data connectivity to a user. The terminal 11 may communicate with one or more core networks via a radio access network (RAN). The terminal 11 may be an Internet of Things (IoT) terminal, such as a sensor device, a cell phone (or "cellular" phone), and a computer with the IoT terminal. Or, the UE 11 may be a stationary, portable, pocket-sized, handheld, computer-built, or vehicle-mounted device, such as, a Station (STA), a subscriber unit, a subscriber station, a mobile station, a mobile, a remote station, an access point, a remote terminal, an access terminal, a user terminal, a user agent, a user device, or a user equipment (UE). Or, the terminal 11 may be an unmanned aerial vehicle device. Or, the terminal 11 may be an in-vehicle device, for example, an electronic control unit having a wireless communication function or a wireless communication device external to the electronic control unit. Or, the terminal 11 may be a roadside device, for example, a street light, a signal light, or other roadside devices having a wireless communication function.

The base station 12 may be a network side device in the wireless communication system. The wireless communication system may be the 4th Generation (4G) mobile communication system, also known as a Long Term Evolution (LTE) system. Or, the wireless communication system may also be a 5G system, also known as a New Radio (NR) system or a 5G NR system. Or, the wireless communication system may be any next generation system of the 5G system. The access network in the 5G system may be called a New Generation-RAN (NG-RAN) or a machine type communication (MTC) system.

The base station 12 may be an evolved base station (eNB) employed in the 4G system. Or, the base station 12 may be a base station (gNB) with a centralized distributed architecture employed in the 5G system. When the base station 12 adopts a centralized-distributed architecture, the base station 12 usually includes a central unit (CU) and at least two distributed units (DUs). The CU is equipped with protocol stacks of a Packet Data Convergence Protocol (PDCP) layer, a Radio Link Control (RLC) layer, and a Media Access Control (MAC) layer. The DU is equipped with a protocol stack of a physical (PHY) layer, and the specific implementation of the base station 12 is not limited in embodiments of the disclosure.

A wireless connection may be established between the base station 12 and the terminal 11 via a radio interface. In different implementations, the radio interface is a radio interface based on the 4G standard. Or, the radio interface is a radio interface based on the 5G standard, such as a NR. Or, the radio interface may be a radio interface based on the standard of the next generation of 5G.

In some embodiments, End to End (E2E) connections are established between the terminals 11 in scenarios, such as, Vehicle to Vehicle (V2V) communication, Vehicle to Infrastructure (V2I) communication, and Vehicle to Pedestrian (V2P) communication in Vehicle to Everything (V2X) communication.

In some embodiments, the above wireless communication system may also include a network management device 13.

The plurality of base stations 12 are connected to the network management device 13 respectively. The network management device 13 may be a core network device in the wireless communication system. For example, the network management device 13 is a Mobility Management Entity (MME) in an Evolved Packet Core (EPC). Or, the network management device may be another core network device, such as a Serving GateWay (SGW), a Public Data Network GateWay (PGW), a Policy and Charging Rules Function (PCRF), or a Home Subscriber Server (HSS), etc. The implementation form of the network management device 13 is not limited in embodiments of the disclosure.

Execution subjects involved in embodiments of the disclosure include, but are not limited to, a cellular phone in a cellular mobile communication system and a network-side device, such as an access network devices such as a base station, and a core network.

In the case that all UEs are woken up at a paging occasion (PO), the UEs can be classified into paging groups, and a paging early indication (PEI) can indicate, taking the paging group as unit, whether UEs need to be woken up at the PO.

One paging grouping mode is that the UEs are classified into groups based on a UE-identifier (ID) through the following equation (1):

$$wg = \text{floor}(\text{floor}\left(\frac{\text{UE\_ID}}{N \times N_s}\right)/N_n)\text{mod}N_w \quad (1)$$

Where, wg represents an index of each paging group resource, the UE-ID modeling mode is randomization (random selection or random allocation), i.e., modeling is performed for all paging group resources based on the UE-ID; N represents a paging frame density in the time domain; $N_s$ represents a paging density in a paging frame in the time domain; $N_n$ represents a paging narrow band; and $N_w$ represents a total number of paging group resources.

Another paging grouping mode is implemented by using a core network as a unified node. The core network can directly assign a group ID to the UE in the NR. When assigning the group ID, the network assigns it based on implementation, for example, according to a terminal attribute or a counted paging probability.

For example, the PEI may include a plurality of bits, and each bit is used to indicate one or more paging groups.

Therefore, how to determine a bit corresponding to the paging group of the UE when the base station sends a PEI and how the UE can determine a bit corresponding the paging group of the UE after the UE receives the PEI are problems to be solved urgently.

Figure 2:
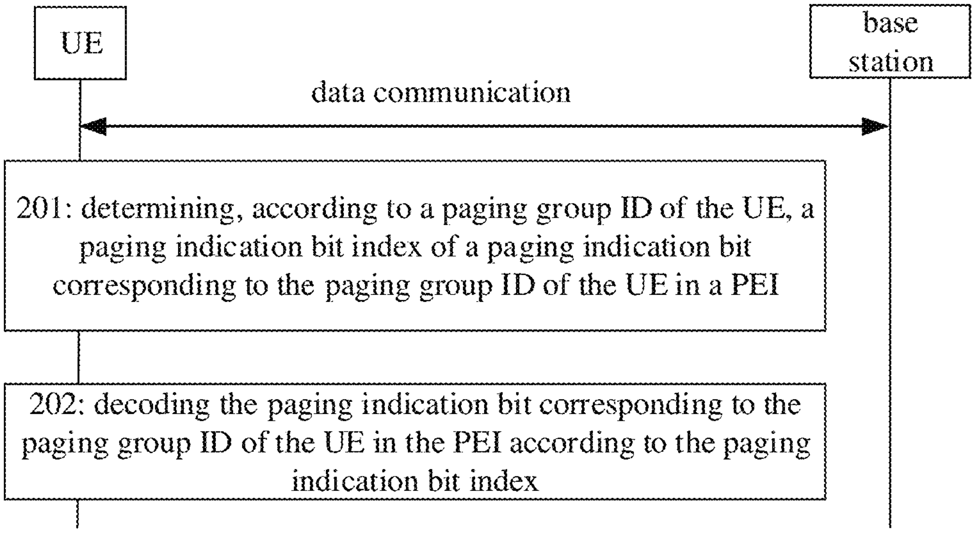
FIG. 2 is a flowchart illustrating a method for determining a paging indication bit according to an exemplary embodiment.

FIG. 2 is a flowchart illustrating a method for determining a paging indication bit according to an exemplary embodiment. The method may be performed by a UE in a cellular mobile communication system, which includes the following steps.

Step 201, a paging indication bit index of a paging indication bit corresponding to a paging group ID of the UE in a PEI is determined according to the paging group ID of the UE.

Step 202, the paging indication bit corresponding to the paging group ID of the UE in the PEI is decoded according to the paging indication bit index.

The paging indication bit carried in the PEI may be used to indicate the UE to wake up at a preset PO and monitor a paging message, or to indicate the UE to stay dormant at the preset PO. The preset PO may include one or more POs after receiving the PEI.

The paging group ID may be used to indicate a paging group. One paging group ID may uniquely indicate one paging group.

The paging group of the UE can be determined by network nodes such as the UE, a base station, or a core network.

The paging group may be a paging group classified based on the UE ID. For example, the paging group ID may be the index of each paging group resource wg determined using the equation (1).

The paging group may also be a paging group classified based on the UE attribute. For example, the paging group ID may be a group ID of a paging group classified by the core network based on the UE attribute.

The PEI may include paging indication bits of one or more POs. One PO may correspond to a plurality of paging indication bits.

For example, the PEI may include POnumPerPEI segments. Each segment contains K indication bits and may correspond to one PO. For a certain segment, each of the K paging indication bits may be used to indicate whether one or more paging groups is to be woken up at a corresponding PO. The POnumPerPEI is the number of preset POs associated with the PEI, and the POnumPerPEI may be a positive integer greater than or equal to 1.

K is determined according to a subgroupsNumPerPO field. If subgroupsNumPerPO is 1, 0 or null, K=1. If subgroupsNumPerPO is greater than or equal to 2 and less than or equal to 8, K=subgroupsNumPerPO.

The embodiment describes an exemplary application scenario using a plurality of paging indication bits of one PO. That is, the method of the embodiments of the disclosure is illustrated by taking one segment as an example.

For one PO, there may be a plurality of paging indication bits in the PEI. One paging indication bit may indicate whether UEs in one or more paging groups is to be woken up at the PO and monitor a paging message. That is, one paging indication bit may correspond to one or more paging groups.

For example, if a paging indication bit is "1", it may indicate all UEs in a paging group corresponding to the paging indication bit to wake up at the PO and monitor the paging message. If a paging indication bit is "0", it may indicate all UEs in a paging group corresponding to the paging indication bit to stay dormant at the PO, for example, staying in a Radio Resource Control (RRC) idle status or a RRC inactive status.

The paging indication bit index, which is a paging indication bit in a paging indication bit field at which the terminal may perform monitoring, may be used to uniquely indicate a corresponding paging indication bit. The paging indication bit may correspond to a paging subgroup provided by a PHY layer, for example, 8 paging indication bits may indicate that the network supports 8 paging subgroups. Therefore, the paging indication bit index may also be represented by a paging subgroup index (isg). The index starts from the value of 0, and 0 corresponds to the first paging indication bit (an index of which also starts from 0) in the paging indication field.

That is, determining the paging indication bit index is equivalent to determining the isg.

Figure 3:
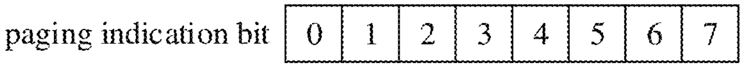
FIG. 3 is a structural diagram illustrating a paging indication bit according to an exemplary embodiment.

For example, as illustrated in FIG. 3, there are 8 paging indication bits in the PEI, which are indicated by a total of 8 paging indication bit indexes from 0 to 7.

There is a correspondence between the paging group ID and the paging indication bit index. The UE or the base station may determine, based on the correspondence, the paging indication bit corresponding to the paging group ID of the UE.

In an embodiment, determining, according to the paging group ID of the UE, the paging indication bit index of the paging indication bit corresponding to the paging group ID of the UE in the PEI, includes: determining the paging indication bit index of the paging indication bit corresponding to the paging group ID of the UE in the PEI according to a first correspondence between paging group IDs and paging indication bit indexes, and the paging group ID of the UE.

The first correspondence between the paging group IDs and the paging indication bit indexes may be preset. The UE or the base station may determine the paging indication bit index corresponding to the paging group of the UE according to the first correspondence and the paging group ID of the UE, and then determine the paging indication bit corresponding to the paging group of the UE.

The first correspondence may be a mapping relation between the paging group IDs and the paging indication bit indexes. One or more paging group IDs may have a mapping relation with one paging indication bit index.

For example, the paging group IDs may have a one-to-one mapping relation with the paging indication bit indexes. For example, the paging group ID "0" may be mapped to the paging indication bit index "0". Multiple paging group IDs may be mapped to one paging indication bit index. For example, the paging group IDs "1" and "2" may be mapped to the paging indication bit index "1".

When the base station sends a paging indication (for indicating the UE to wake up or stay dormant at the PO) to the UE via the PEI, it may determine the paging group ID of the paging group of the UE, determine the paging indication bit index corresponding to the paging group ID according to the first correspondence, and then determine the paging indication bit in the PEI corresponding to the paging group of the UE, and send the paging indication to the UE by setting different values for the paging indication bit.

After receiving the PEI, the UE may determine the paging group ID of the paging group of the UE, determine the paging indication bit index corresponding to the paging group ID according to the first correspondence, determine the paging indication bit in the PEI corresponding to the paging group of the UE, and determine whether to wake up or stay dormant at the PO according to an indication of the paging indication bit.

In this way, the paging indication bit index corresponding to the paging group ID of the UE is determined according to the first correspondence between the paging group IDs and the paging indication bit indexes, and the paging indication bit corresponding to the paging group ID of the UE is determined. The base station and the UE may accurately determine the paging indication bit of the UE, which avoids the situation of failing to accurately send a paging indication to the UE due to inconsistent identification of the paging indication bit of the UE between the base station and the UE, and improves the reliability of sending the paging indication to the UE through the paging indication bit in the PEI.

Figure 4:
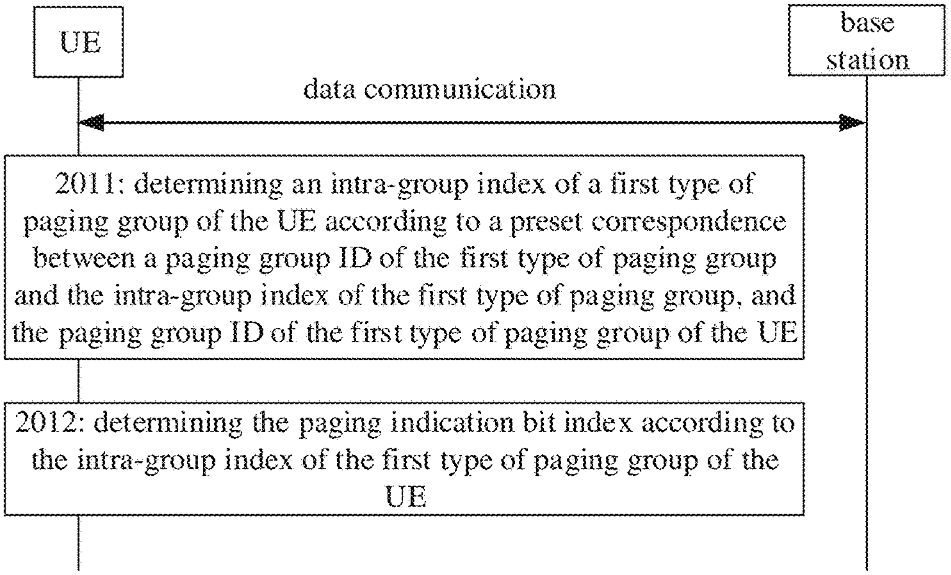
FIG. 4 is a flowchart illustrating a method for determining a paging indication bit according to an exemplary embodiment.

In an embodiment, as illustrated in FIG. 4, step 201 includes followings.

Step 2011, an intra-group index of a first type of paging group of the UE is determined according to a preset correspondence between a paging group ID of the first type of paging group and the intra-group index of the first type of paging group, and the paging group ID of the first type of paging group of the UE.

Step 2012, the paging indication bit index is determined according to the intra-group index of the first type of paging group of the UE.

In the paging indication bits of a PO, the PEI may include only the paging indication bits corresponding to the first type of paging group, or may include only the paging indication bits corresponding to a second type of paging group, or may include both the paging indication bits corresponding to the first type of paging group and the paging indication bits corresponding to the second type of paging group. The first type of paging group is different from the second type of paging group.

For example, the first type of paging group may be a paging group classified by the core network based on the UE attribute, i.e., the core network assigns a paging group ID for the UE, and the second type of paging group may be a paging group classified based on the UE-ID. Or, the first type of paging group may be a paging group classified based on the UE-ID, and the second type of paging group may be a paging group classified by the core network based on the UE attribute.

For example, the first type of paging group includes M paging groups. The second type of paging group includes N paging groups. For a PO, the PEI includes K paging indication bits. K is determined by subgroupsNumPerPO. If subgroupsNumPerPO is 1, 0 or null, K=1. If subgroupsNumPerPO is greater than or equal to 2 and less than or equal to 8, then K=subgroupsNumPerPO.

Figure 5A:
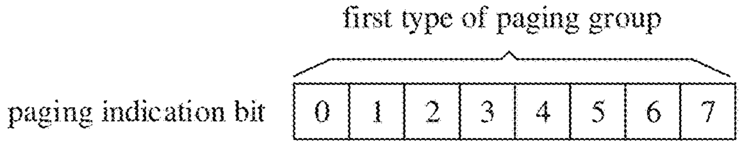
FIG. 5*a* is a structural diagram illustrating a paging indication bit according to an exemplary embodiment.

For a PO, when the PEI contains only the paging indication bits corresponding to the first type of paging group, M is less than or equal to K. For example, as illustrated in FIG. 5*a*, for a PO, the PEI includes 8 paging indication bits, and the first type of paging group occupies 8 paging indication bits.

When the PEI contains only the paging indication bits corresponding to the second type of paging group, N is less than or equal to K.

When the PEI contains both the paging indication bits corresponding to the first type of paging group and the paging indication bits corresponding to the second type of paging group, the sum of M and N is less than or equal to K. The first type of paging group may occupy M consecutive paging indication bits in the PEI, and the second type of paging group may occupy N consecutive paging indication bits in the PEI.

Figure 5B:
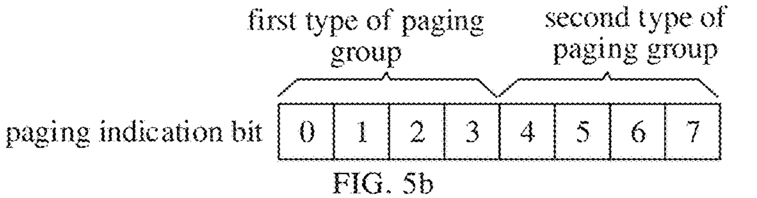
FIG. 5*b* is a structural diagram illustrating a paging indication bit according to an exemplary embodiment.
Figure 5C:
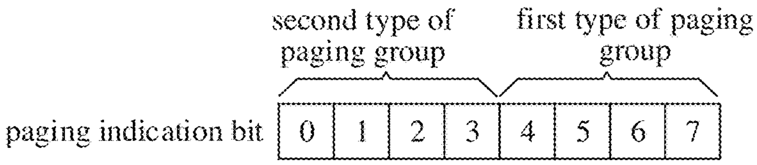
FIG. 5*c* is a structural diagram illustrating a paging indication bit according to an exemplary embodiment.

For example, as illustrated in FIG. 5*b* or FIG. 5*c*, for a PO, the PEI includes 8 paging indication bits, in which the first type of paging group occupies 4 paging indication bits and the second type of paging group occupies 4 paging indication bits.

The paging group of the UE is the first type of paging group, and a position of the paging group ID of the UE in the M paging indication bits occupied in the PEI by the first type of paging group is determined, i.e., the intra-group index is determined. According to the positions of the M paging indication bits in the K paging indication bits, the paging indication bit index corresponding to the intra-group index is determined.

The above preset correspondence may be set in advance, and the intra-group index corresponding to the paging group of the UE may be determined according to the preset correspondence and the paging group ID of the UE.

The preset correspondence may be a mapping relation between paging group IDs and intra-group indexes. One or more paging group IDs may have a mapping relation with one intra-group index.

The correspondence between the intra-group indexes and the paging indication bit indexes may be determined according to the paging indication bits in the PEI occupied by the first type of paging group and the positions of all the paging indication bits in the PEI. According to the correspondence between the intra-group indexes and the paging indication bit indexes, and the intra-group index of the first type of paging group of the UE, the paging indication bit index is determined.

In an embodiment, the preset correspondence includes:

the intra-group index of the first type of paging group being the paging group ID of the first type of paging group.

The paging group ID may be in a one-to-one mapping relation with the intra-group index. For example, the paging group ID “0” may be mapped to the intra-group index “0”, and the paging group ID “1” may be mapped to the intra-group index “1”.

For example, the first type of paging group may be a paging group classified by the core network based on the UE attribute. The first type of paging group occupies M paging indication bits in the PEI. According to the mapping relation between the paging group ID and the intra-group index, and the paging group ID, a corresponding intra-group index can be obtained. The paging indication bit index that is to be monitored can be determined according to the intra-group index.

In an embodiment, the preset correspondence includes:

within the first type of paging group, one paging group ID corresponds to one intra-group index;

or within the first type of paging group, a plurality of paging group IDs correspond to one intra-group index.

The mapping relation between the paging group ID and the intra-group index may be a one-to-one mapping relation. If the number of paging groups of the first type of paging group is less than or equal to M, the paging group ID (subgroup id) assigned by the core network can be directly used as the intra-group index.

If the number of groups of the first type of paging group is greater than M, multiple paging group IDs may be mapped to one intra-group index, for example, mapped to the last intra-group index.

For example, if the number of paging groups of the first type of paging group is 8, and for a PO, the first type of paging group occupies 4 paging indication bits in the PEI, thus the paging group IDs 0-3 may be mapped to the intra-group indexes 0-3, respectively, and the paging group IDs 4-7 may be all mapped to the intra-group index 3. Or, the paging group IDs 0-1 are mapped to the intra-group index 0, and the paging group IDs 2-3 are mapped to the intra-group index 1, and so on.

In an embodiment, determining the paging indication bit index according to the intra-group index of the first type of paging group of the UE, includes one of the following:

- determining the intra-group index of the first type of paging group of the UE as the paging indication bit index; or
- determining the paging indication bit index according to the intra-group index of the first type of paging group of the UE and an offset corresponding to the first type of paging group.

For example, the first type of paging group may be a paging group classified by the core network based on the UE attribute or a paging group classified based on the UE-ID. The first type of paging group occupies M paging indication bits in the PEI.

For a PO, a start position of the M paging indication bits occupied by the first type of paging group in the K paging indication bits may be a paging indication bit with the paging indication bit index "0". That is, the start position of the intra-group index is aligned with the start position of the paging indication bit index, and thus the intra-group index can be determined as the paging indication bit index.

The offset may be determined based on the start position of the paging indication bits of the first type of paging group in the K paging indication bits of the PEI. The start position of the paging indication bits of the first type of paging group in all the paging indication bits of the PEI may be specified by a communication protocol or agreed upon by the UE, the base station and/or the core network.

The start position of the M paging indication bits in the PEI may be a position deviated by the offset from the paging indication bit with the paging indication bit index "0". The paging indication bit index may be determined according to the intra-group index and the offset. For example, the paging indication bit index can be determined by adding the intra-group index and the offset together.

Figure 6:
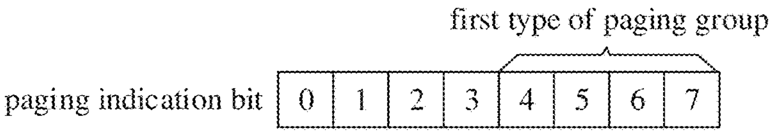
FIG. 6 is a structural diagram illustrating a paging indication bit according to an exemplary embodiment.

For example, as illustrated in FIG. 6, the first type of paging group includes 4 paging groups. For a PO, the PEI includes 8 paging indication bits. The start position of the 4 paging groups of the first type of paging group is located at a position having an offset 4 deviated from the paging indication bit with the paging indication bit index "0", i.e., the offset is 4. After the intra-group index corresponding to the paging group ID of the UE is determined, the sum of the intra-group index and the offset (i.e., 4) is determined as the paging indication bit index. For example, if the intra-group index is "0", the sum 4 obtained by adding the intra-group index 0 and the offset 4 is determined as the paging indication bit index of the paging group ID of the UE.

In an embodiment, in response to the PEI including one or more paging indication bits corresponding to the first type of paging group and one or more paging indication bits corresponding to a preset type of paging group, the offset is a number of paging groups of the preset type of paging group.

For example, the first type of paging group includes M paging groups, a second type of paging group includes N paging groups, and the PEI includes K paging indication bits, the intra-group index of the second type of paging group is aligned with the paging indication bit index, and the intra-group index of the first type of paging group is deviated from the paging indication bit index by the offset.

For example, as illustrated in FIG. 5*c*, the first type of paging group includes 4 paging groups, a number of paging groups of the second type of paging group is 4, and the PEI includes 8 paging indicator bits, the intra-group index of the second type of paging group is aligned with the paging indication bit index, and the intra-group index of the first type of paging group deviates from the paging indication bit index by the offset of 4. The paging indication bit index can be determined according to the intra-group index and the offset. That is, the sum of the intra-group index of the first type of paging group and the offset of 4 is determined as the paging indication bit index.

In an embodiment, in response to the PEI including one or more paging indication bits corresponding to the first type of paging group and one or more paging indication bits corresponding to the preset type of paging group, the offset is 0.

The offset may be determined based on the position of the paging indication bit of the first type of paging group in all the paging indication bits of the PEI. If the intra-group index of the paging indication bit of the first type of paging group is aligned with the paging indication bit index, the offset may be determined to be 0.

For example, the first type of paging group includes M paging groups, the second type of paging group includes N paging groups, and the PEI includes K paging indication bits, the intra-group index of the first type of paging group is aligned with the paging indication bit index, and thus the offset is 0.

For example, as illustrated in FIG. 5*b*, the first type of paging group includes 4 paging groups, the number of paging groups of the second type of paging group is 4, and the PEI includes 8 paging indication bits, the intra-group index of the first type of paging group is aligned with the paging indication bit index, and thus the intra-group index of the first type of paging group is determined as the paging indication bit index, i.e., the offset is 0.

Figure 7:
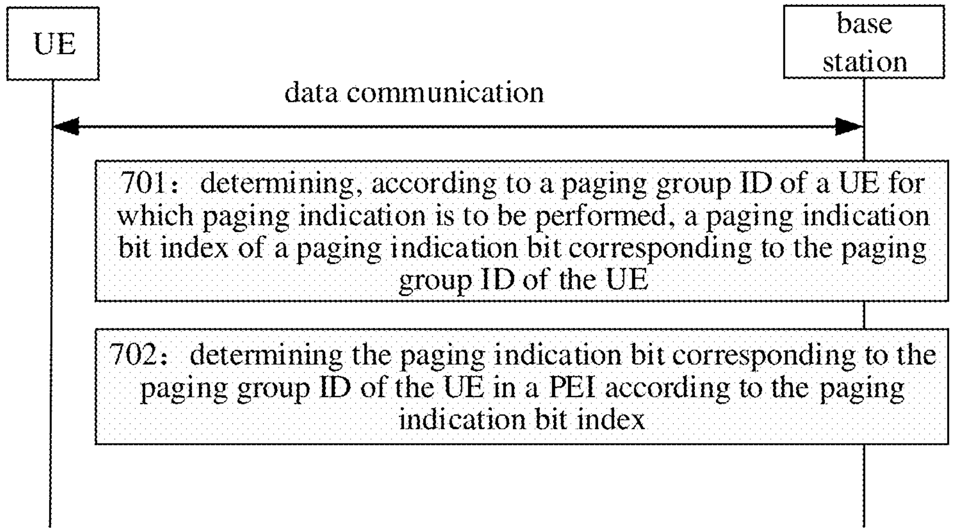
FIG. 7 is a flowchart illustrating a method for determining a paging indication bit according to an exemplary embodiment.

FIG. 7 is a flowchart illustrating a method for determining a paging indication bit according to an exemplary embodiment. The method is performed by a base station in a cellular mobile communication system. The method includes the following steps.

Step 701, according to a paging group ID of a UE for which paging indication is to be performed, a paging indication bit index of a paging indication bit corresponding to the paging group ID of the UE is determined.

Step 702, the paging indication bit corresponding to the paging group ID of the UE in a PEI is determined according to the paging indication bit index.

The paging indication bit carried in the PEI may be used to indicate the UE to wake up at a preset PO and monitor a paging message, or indicate the UE to stay dormant at the preset PO. The preset PO may include one or multiple POs after receiving the PEI.

The paging group ID may be used to indicate a paging group. One paging group ID can uniquely indicate one paging group.

The paging group for the UE can be determined by network nodes such as the UE, the base station, and a core network.

The paging group may be a paging group classified based on the UE-ID. For example, the paging group ID may be the index of each paging group resource wg determined by equation (1).

The paging group may also be a paging group classified based on the UE attribute. For example, the paging group ID may be a group ID of a paging group classified by the core network based on the UE attribute.

The PEI may include PO paging indication bits of one or more POs. One PO may correspond to a plurality of paging indication bits.

For example, the PEI may include POnumPerPEI segments. Each segment contains K indication bits and may correspond to one PO. For a certain segment, each of the K paging indication bits may be used to indicate whether one or more paging groups is to be woken up at a corresponding PO. The POnumPerPEI is the number of preset POs associated with the PEI, and the POnumPerPEI may be a positive integer greater than or equal to 1.

K is determined according to a subgroupsNumPerPO field. If subgroupsNumPerPO is 1, 0 or null, K=1. If subgroupsNumPerPO is greater than or equal to 2 and less than or equal to 8, K=subgroupsNumPerPO.

The embodiment describes an exemplary application scenario using a plurality of paging indication bits of one PO. That is, the method of the embodiments of the disclosure is illustrated by taking one segment as an example.

For one a PO, there may be a plurality of paging indication bits in the PEI. One paging indication bit may indicate whether UEs in one or more paging groups is to be woken up at the PO and monitor a paging message. That is, one paging indication bit may correspond to one or more paging groups.

For example, if a paging indication bit is “1”, it may indicate all UEs in a paging group corresponding to the paging indication bit to wake up at the PO and monitor the paging message. If a paging indication bit is “0”, it may indicate all UEs in a paging group corresponding to the paging indication bit to stay dormant at the PO, for example, staying in a RRC idle status or a RRC inactive status.

The paging indication bit index, which is a paging indication bit in a paging indication bit field at which the terminal may perform monitoring, may be used to uniquely indicate a corresponding paging indication bit. The paging indication bit may correspond to a paging subgroup provided by a PHY layer, for example, 8 paging indication bits may indicate that the network supports 8 paging subgroups. Therefore, the paging indication bit index may also be represented by a paging subgroup index or isg. The index starts from the value of 0, and 0 corresponds to the first paging indication bit (an index of which also starts from 0) in the paging indication field.

That is, determining the paging indication bit index is equivalent to determining the isg.

For example, as illustrated in FIG. 3, there are 8 paging indication bits in the PEI, which are indicated by a total of 8 paging indication bit indexes from 0 to 7.

There is a correspondence between the paging group ID and the paging indication bit index. The UE or the base station may determine, based on the correspondence, the paging indication bit corresponding to the paging group ID of the UE.

In an embodiment, determining, according to the paging group ID of the UE for which paging indication is to be performed, the paging indication bit index of the paging indication bit corresponding to the paging group ID of the UE, includes: determining the paging indication bit index of the paging indication bit corresponding to the paging group ID of the UE in the PEI according to a first correspondence between paging group IDs and paging indication bit indexes, and the paging group ID of the UE.

The first correspondence between the paging group IDs and the paging indication bit indexes may be preset. The UE or the base station may determine the paging indication bit index corresponding to the paging group of the UE according to the first correspondence and the paging group ID of the UE, and then determine the paging indication bit corresponding to the paging group of the UE.

The first correspondence may be a mapping relation between the paging group IDs and the paging indication bit indexes. One or more paging group IDs may have a mapping relation with one paging indication bit index.

For example, the paging group IDs may have a one-to-one mapping relation with the paging indication bit indexes. For example, the paging group ID “0” may be mapped to the paging indication bit index “0”. Multiple paging group IDs may be mapped to one paging indication bit index. For example, the paging group IDs “1” and “2” may be mapped to the paging indication bit index “1”.

When the base station sends a paging indication (for indicating the UE to wake up or stay dormant at the PO) to the UE via the PEI, it may determine the paging group ID of the paging group of the UE, determine the paging indication bit index corresponding to the paging group ID according to the first correspondence, and then determine the paging indication bit in the PEI corresponding to the paging group of the UE, and send the paging indication to the UE by setting different values for the paging indication bit.

After receiving the PEI, the UE may determine the paging group ID of the paging group of the UE, determine the paging indication bit index corresponding to the paging group ID according to the first correspondence, determine the paging indication bit in the PEI corresponding to the paging group of the UE, and determine whether to wake up or stay dormant at the PO according to an indication of the paging indication bit.

In this way, the paging indication bit index corresponding to the paging group ID of the UE is determined according to the first correspondence between the paging group IDs and the paging indication bit indexes, and the paging indication bit corresponding to the paging group ID of the UE is determined. The base station and the UE may accurately determine the paging indication bit of the UE, which avoids the situation of failing to accurately send a paging indication to the UE due to inconsistent identification of the paging indication bit of the UE between the base station and the UE, and improves the reliability of sending the paging indication to the UE through the paging indication bit in the PEI.

Figure 8:
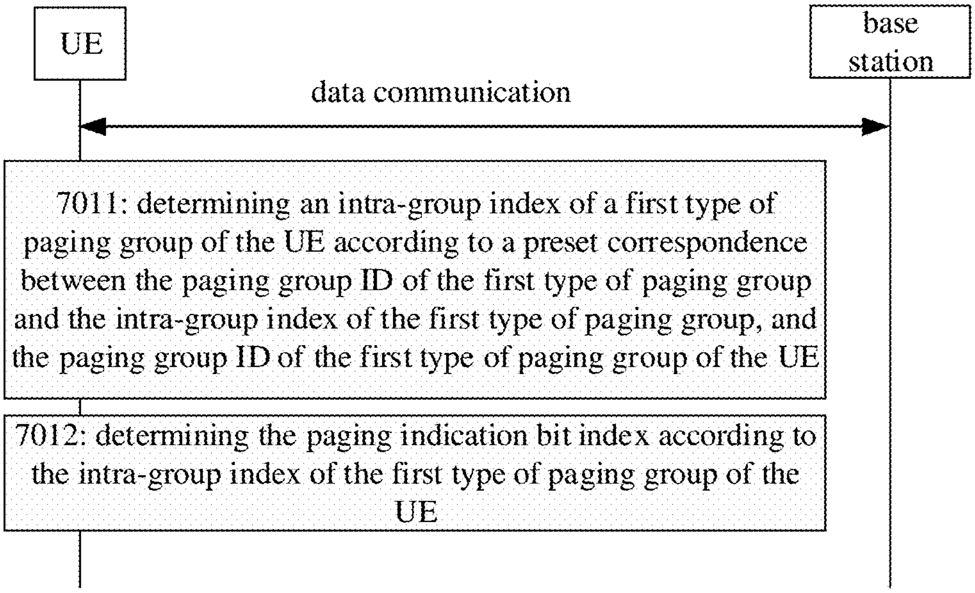
FIG. 8 is a flowchart illustrating a method for determining a paging indication bit according to an exemplary embodiment.

In an embodiment, as illustrated in FIG. 8, step 701 includes followings.

Step 7011, an intra-group index of a first type of paging group of the UE is determined according to a preset correspondence between a paging group ID of the first type of paging group and the intra-group index of the first type of paging group, and the paging group ID of the first type of paging group of the UE.

Step 7012, the paging indication bit index is determined according to the intra-group index of the first type of paging group of the UE.

In the paging indication bits of a PO, the PEI may include only the paging indication bits corresponding to the first type of paging group, or may include only the paging indication bits corresponding to a second type of paging group, or may include both the paging indication bits corresponding to the first type of paging group and the paging indication bits corresponding to the second type of paging group. The first type of paging group is different from the second type of paging group.

For example, the first type of paging group may be a paging group classified by the core network based on the UE attribute, i.e., the core network assigns a paging group ID for the UE, and the second type of paging group may be a paging group classified based on the UE-ID. Or, the first type of paging group may be a paging group classified based on the UE-ID, and the second type of paging group may be a paging group classified by the core network based on the UE attribute.

For example, the first type of paging group includes M paging groups. The second type of paging group includes N paging groups. For a PO, the PEI includes K paging indication bits. K is determined by subgroupsNumPerPO. If subgroupsNumPerPO is 1, 0 or null, K=1. If subgroupsNumPerPO is greater than or equal to 2 and less than or equal to 8, then K=subgroupsNumPerPO.

For a PO, when the PEI contains only the paging indication bits corresponding to the first type of paging group, M is less than or equal to K. For example, as illustrated in FIG. 5*a*, for a PO, the PEI includes 8 paging indication bits, and the first type of paging group occupies 8 paging indication bits.

When the PEI contains only the paging indication bits corresponding to the second type of paging group, N is less than or equal to K.

When the PEI contains both the paging indication bits corresponding to the first type of paging group and the paging indication bits corresponding to the second type of paging group, the sum of M and N is less than or equal to K. The first type of paging group may occupy M consecutive paging indication bits in the PEI, and the second type of paging group may occupy N consecutive paging indication bits in the PEI.

For example, as illustrated in FIG. 5*b* or FIG. 5*c*, for a PO, the PEI includes 8 paging indication bits, in which the first type of paging group occupies 4 paging indication bits and the second type of paging group occupies 4 paging indication bits.

The paging group of the UE is the first type of paging group, and a position of the paging group ID of the UE in the M paging indication bits occupied in the PEI by the first type of paging group is determined, i.e., the intra-group index is determined. According to the positions of the M paging indication bits in the K paging indication bits, the paging indication bit index corresponding to the intra-group index is determined.

The above preset correspondence may be set in advance, and the intra-group index corresponding to the paging group of the UE may be determined according to the preset correspondence and the paging group ID of the UE.

The preset correspondence may be a mapping relation between paging group IDs and intra-group indexes. One or more paging group IDs may have a mapping relation with one intra-group index.

The correspondence between the intra-group indexes and the paging indication bit indexes may be determined according to the paging indication bits in the PEI occupied by the first type of paging group and the positions of all the paging indication bits in the PEI. According to the correspondence between the intra-group indexes and the paging indication bit indexes, and the intra-group index of the first type of paging group of the UE, the paging indication bit index is determined.

In an embodiment, the preset correspondence includes:

the intra-group index of the first type of paging group being the paging group ID of the first type of paging group.

The paging group ID may be in a one-to-one mapping relation with the intra-group index. For example, the paging group ID "0" may be mapped to the intra-group index "0", and the paging group ID "1" may be mapped to the intra-group index "1".

For example, the first type of paging group may be a paging group classified by the core network based on the UE attribute. The first type of paging group occupies M paging indication bits in the PEI. According to the mapping relation between the paging group ID and the intra-group index, and the paging group ID, a corresponding intra-group index can be obtained. The paging indication bit index that is to be monitored can be determined according to the intra-group index.

In an embodiment, the preset correspondence includes:

within the first type of paging group, one paging group ID corresponds to one intra-group index;

or within the first type of paging group, a plurality of paging group IDs correspond to one intra-group index.

The mapping relation between the paging group ID and the intra-group index may be a one-to-one mapping relation. If the number of paging groups of the first type of paging group is less than or equal to M, the paging group ID (subgroup id) assigned by the core network can be directly used as the intra-group index.

If the number of groups of the first type of paging group is greater than M, multiple paging group IDs may be mapped to one intra-group index, for example, mapped to the last intra-group index.

For example, if the number of paging groups of the first type of paging group is 8, and for a PO, the first type of paging group occupies 4 paging indication bits in the PEI, thus the paging group IDs 0-3 may be mapped to the intra-group indexes 0-3, respectively, and the paging group IDs 4-7 may be all mapped to the intra-group index 3. Or, the paging group IDs 0-1 are all mapped to the intra-group index 0, and the paging group IDs 2-3 are mapped to the intra-group index 1, and so on.

In an embodiment, determining the paging indication bit index according to the intra-group index of the first type of paging group of the UE, includes one of the following:

determining the intra-group index of the first type of paging group of the UE as the paging indication bit index; or determining the paging indication bit index according to the intra-group index of the first type of paging group of the UE and an offset corresponding to the first type of paging group.

For example, the first type of paging group may be a paging group classified by the core network based on the UE attribute or a paging group classified based on the UE-ID. The first type of paging group occupies M paging indication bits in the PEI.

For a PO, a start position of the M paging indication bits occupied by the first type of paging group in the K paging indication bits may be a paging indication bit with the paging indication bit index "0". That is, the start position of the intra-group index is aligned with the start position of the paging indication bit index, and thus the intra-group index can be determined as the paging indication bit index.

The offset may be determined based on the start position of the paging indication bits of the first type of paging group in the K paging indication bits of the PEI. The start position of the paging indication bits of the first type of paging group in all the paging indication bits of the PEI may be specified by a communication protocol or agreed upon by the UE, the base station and/or the core network.

The start position of the M paging indication bits in the PEI may be a position deviated by the offset from the paging indication bit with the paging indication bit index “0”. The paging indication bit index may be determined according to the intra-group index and the offset. For example, the paging indication bit index can be determined by adding the intra-group index and the offset together.

For example, as illustrated in FIG. 6, the first type of paging group includes 4 paging groups. For a PO, the PEI includes 8 paging indication bits. The start position of the 4 paging groups of the first type of paging group is located at a position having an offset 4 deviated from the paging indication bit with the paging indication bit index “0”, i.e., the offset is 4. After the intra-group index corresponding to the paging group ID of the UE is determined, the sum of the intra-group index and the offset (i.e., 4) is determined as the paging indication bit index. For example, if the intra-group index is “0”, the sum 4 obtained by adding the intra-group index 0 and the offset 4 is determined as the paging indication bit index of the paging group ID of the UE.

In an embodiment, in response to the PEI including one or more paging indication bits corresponding to the first type of paging group and the one or more paging indication bits corresponding to a preset type of paging group, the offset is a number of paging groups of the preset type of paging group.

For example, the first type of paging group includes M paging groups, a second type of paging group includes N paging groups, and the PEI includes K paging indication bits, the intra-group index of the second type of paging group is aligned with the paging indication bit index, and the intra-group index of the first type of paging group is deviated from the paging indication bit index by the offset.

For example, as illustrated in FIG. 5*c*, the first type of paging group includes 4 paging groups, a number of paging groups of the second type of paging group is 4, and the PEI includes 8 paging indicator bits, the intra-group index of the second type of paging group is aligned with the paging indication bit index, and the intra-group index of the first type of paging group deviates from the paging indication bit index by the offset of 4. The paging indication bit index can be determined according to the intra-group index and the offset. That is, the sum of the intra-group index of the first type of paging group and the offset of 4 is determined as the paging indication bit index.

In an embodiment, in response to the PEI including one or more paging indication bits corresponding to the first type of paging group and the one or more paging indication bits corresponding to the preset type of paging group, the offset is 0.

The offset may be determined based on the positions of the paging indication bit of the first type of paging group in all the paging indication bits of the PEI. If the intra-group index of the paging indication bit of the first type of paging group is aligned with the paging indication bit index, the offset may be determined to be 0.

For example, the first type of paging group includes M paging groups, the second type of paging group includes N paging groups, and the PEI includes K paging indication bits, the intra-group index of the first type of paging group is aligned with the paging indication bit index, and thus the offset is 0.

For example, as illustrated in FIG. 5*b*, the first type of paging group includes 4 paging groups, the number of paging groups of the second type of paging group is 4, and the PEI includes 8 paging indication bits, the intra-group index of the first type of paging group is aligned with the paging indication bit index, and thus the intra-group index of the first type of paging group is determined as the paging indication bit index, i.e., the offset is 0.

A specific example is provided below in combination with any of the above embodiments.

1. A method for a UE to determine a paging indication bit to be monitored by the UE in the process of monitoring a paging message.

a) The paging indication bit is placed in a PEI.

b) The paging indication bit is used to indicate whether to wake up a paging group in which the UE is located (1 means wake-up, 0 means not wake-up).

2. The UE determines a group (i.e., a total number and/or a start position) of available paging indication bits for the core network-assigned (CN-assigned) grouping and/or the UE-ID based grouping.

There are K paging indication bits in a PEI. K is a total number of paging groups supported by the base station for one PO, which corresponds to the K paging indication bits. Each indication bit indicates whether or not to wake up one or more paging groups.

a) According to the capacity of the base station, if both the CN-assigned grouping and the UE-ID based grouping are supported, the number of paging groups for the CN-assigned grouping and the number of paging groups for the UE-ID based grouping are M and N, respectively. M is greater than or equal to 1, and N is greater than or equal to 1.

In this case, M+N<=K.

Furthermore, M+N=K.

The specific value of M, as well as a value range of M, can be known. For example, if CN-assigned grouping is supported, it is determined that M is greater than or equal to 1.

In this case, a range of the available paging indication bit also includes a position of a grouping indication supported by the CN-assigned grouping in the K paging indication bits.

As an embodiment, the positions of the M groups in the K paging indication bits starts from a position with the bit index being the offset.

The offset may be agreed upon by a protocol, which may be 0 or N, N being a positive integer greater than 0. If the offset is 0, it is determined that a certain type of group is placed first in the paging indication bit field, and another type of group is placed at the back in the paging indication bits. If the offset is N, it means that the another type of group is placed first in the paging indication bits (N bits are reserved for the another type of group), and the certain type of group is placed at the back in the paging indication bit field. An offset is used for indicating the position where it is placed in the paging indication bit field.

The offset shows a base station configuration.

If the offset is not configured, i.e., the offset=0.

The range of the available paging indication bit includes the positions of the groups supported by the CN-assigned grouping in the K paging indication bits.

As an embodiment, the position of the N groups in the K paging indication bits starts from a position with the bit index being the offset.

The offset may be agreed upon by a protocol, which may be 0 or N, N being a positive integer greater than 0. If the offset is 0, it is determined that a certain type of group is placed first in the paging indication bit field, and another type of group is placed at the back in the paging indication bits. If the offset is N, it means that the another type of group is placed first in the paging indication bits (N bits are reserved for the another type of group), and the certain type of group is placed at the back in the paging indication bit field. An offset is used for indicating the position where it is placed in the paging indication bit field.

The offset shows a base station configuration.

If the offset is not configured, i.e., the offset=0.

As an embodiment, the protocol specifies that the positions of the N groups start from the position M in the K paging indication bits.

For example, as illustrated in FIG. 3, K=8, where 4 groups (0-3) are configured as paging groups for the CN-assigned grouping, and 4 groups (4-7) are configured as paging groups for the UE-ID based grouping.

Depending on the capacity of the base station, if only the CN-assigned grouping is supported, the total number of groups for the CN-assigned grouping is M, where M is greater than or equal to 1.

As an embodiment, the protocol specifies that the positions of the M groups start from a position with the bit index being 0 in the K paging indication bits.

As an embodiment, the protocol specifies that the positions of the M groups in the K paging indication bits starts from a position with the bit index being an offset, which may be 0.

M may be equal to K, i.e., all K groups are used for the CN-assigned grouping.

The UE determines that the total number of groups for the UE-ID based grouping is 0.

b) According to the capability of the base station, if only the UE-ID based grouping is supported, the total number of groups for the UE-ID based grouping is N, where N is greater than or equal to 1.

As an embodiment, the protocol specifies that the positions of the N groups in the K paging indication bits start from the position with a bit index of 0 (preferred).

As an embodiment, the protocol specifies that the positions of the N groups in the K paging indication bits start from the position with the bit index being an offset.

N may be equal to K, i.e. all K groups are used for the UE-ID based grouping.

The UE determines that the total number of groups for the CN-assigned grouping is 0.

In the above, K is the total number of groups supported by the base station, which corresponds to K paging indication bits, each paging indication bit may indicate whether a paging group is to be woken up or not.

Though this step, M groups for the CN-assigned grouping and N groups for the UE-ID based grouping (where M=0 or N=0) and their position distributions in the K paging indication bits are obtained.

3. The UE obtains the range of the available paging indication bit, and determines its paging indication bit index (isg) through the following two steps:

1) finding an intra-group index of a group in a supported specific grouping type; and
2) obtaining a final paging indication bit index (isg) by adding an offset to the intra-group index.

a) For a base station that supports (supports or only supports) the CN-assigned grouping, a UE that is assigned with a CN-assigned subgroup ID by the CN (which implicitly indicates that the UE supports the CN-assigned grouping) can use a specific mapping relation to determine the intra-group index in a supported specific type of grouping.

The intra-group index is added to the offset (if any) to obtain the paging indication bit index (isg) to be monitored.

For example, if the mapping relation is a one-to-one correspondence relation, the subgroup ID assigned by the CN is directly used as the intra-group index of the specific type of grouping.

For example, the base station can know that the maximum range of the subgroup ID assigned by the CN is 0-3. If the base station assigns a sufficient number of groups (for example, M is greater than 4), the UE does not need to know M and can directly use the subgroup ID assigned by the CN as the intra-group index in the specific type of grouping.

For example, the mapping relation is a one-to-one correspondence relation, and M=4.

For subgroup IDs 0-3, 0-3 can be found as the intra-group indexes.

Subgroup IDs 4-7 can all be mapped to the intra-group index 3, which is the last index.

Or, for example, the mapping relation is that multiple subgroup IDs are mapped to one intra-group index, and M=4.

For subgroup IDs 0-1, 0 can be used as the intra-group index, and for subgroup IDs 2-3, 1 can be used as the intra-group index, and so on.

Or no intra-group index is found, the isg is determined to be invalid and no valid paging indication bit index (isg) can be determined, and thus there is no need to monitor the paging indication bits in the PEI. That is, the legacy paging monitoring mode is entered, and monitoring is performed at each PO.

If the UE does not have a subgroup ID group assigned by the CN, the UE may be unable to determine a valid paging indication bit index (isg), and there is no need to monitor the paging indication bits in the PEI. That is, it enters into the legacy paging monitoring mode and monitors at each PO.

b) For a base station that supports (supports or only supports) the UE-ID based grouping, if a UE supporting the UE-ID based grouping does not have a subgroup ID group assigned by the CN (in the case that the base station supports not only the UE-ID based grouping, N<K), the equation (1) can be used to obtain a paging group ID, and then an intra-group index of a supported specific type of grouping is obtained.

The intra-group index is added to the offset (if any) to obtain the paging indication bit index (isg) to be monitored.

a UE supporting the UE-ID based grouping, regardless of whether or not it is assigned with a subgroup ID assigned by the CN (in a case where the base station only supports the UE-ID based grouping, N=K), equation (1) can be used to obtain the paging group ID and then an intra-group index of a supported specific type of grouping is obtained.

The intra-group index is added to the offset (if any) to obtain the paging indication bit index (isg) to be monitored.

A UE not supporting the UE-ID based grouping is unable to determine a valid paging indication bit index (isg), and there is no need to monitor the paging indication bits in the PEI. That is, it enters the legacy paging monitoring mode and monitors at each PO.

A preferred embodiment of this workflow is given below.

For example, the base station configures subgroupsNumPerPO to be an integer in the range of 2-8 (e.g., 8), $N_{sg\text{-}UEID}$ groups are configured for the UE-ID based grouping.

In case 1, the network supports two types of grouping (e.g., the $N_{sg\text{-}UEID}$ is set to be less than subgroupsNumPerPO and for example, it is 8).

For example, the UE-ID based grouping is placed at the front of the paging indication field, and the CN-assigned grouping is placed at the back of the paging indication field.

For a UE that is assigned with a group by the CN, isg=CN-assigned subgroup ID+$N_{sg\text{-}UEID}$.

For a UE that is not assigned a group by the CN and supports the UE-ID based grouping, $$isg = \text{floor}(\text{floor}\left(\frac{\text{UE\_ID}}{N \times N_s}\right)/N_n)\text{mod}N_w;\ N_w = N_{sg-UEID}.$$

For example, the UE-ID based grouping is placed at the back of the paging indication field, the CN-assigned grouping is placed at the front of the paging indication field.

For a UE that is assigned a group by the CN, isg=CN-assigned subgroup ID.

For a UE that is not assigned a group by the CN and supports the UE-ID based grouping, $$isg = \text{floor}(\text{floor}\left(\frac{\text{UE\_ID}}{N \times N_s}\right)/N_n)\text{mod}N_w + \text{offset};$$

where $N_w=N_{sg\text{-}UEID}$, and offset=subgroupsNumPerPO-$N_{sg\text{-}UEID}$.

In Case 2, the network supports one type of grouping, which is the UE-ID based grouping.

For a UE that supports the UE-ID based grouping, $$isg = \text{floor}(\text{floor}\left(\frac{\text{UE\_ID}}{N \times N_s}\right)/N_n)\text{mod}N_w);$$

where $N_w$=subgroupsNumPerPO.

In Case 3, the network supports one type of grouping, which is the CN-assigned grouping.

For a UE that is assigned a group by the CN, isg=CN-assigned subgroup ID; or isg=CN-assigned subgroup ID+$N_{sg\text{-}UEID}$ ($N_{sg\text{-}UEID}$=0).

Figure 9:
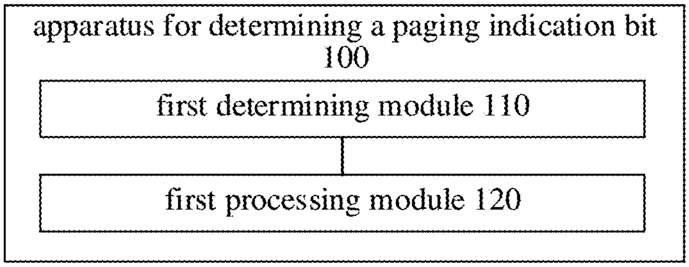
FIG. 9 is a block diagram of an apparatus for determining a paging indication bit according to an exemplary embodiment.

Embodiments of the disclosure further provide an apparatus for determining a paging indication bit. As illustrated in FIG. 9, the apparatus is applied to a UE in cellular mobile wireless communication. The apparatus 100 includes:

a first determining module 110, configured to determine, according to a paging group ID of the UE, a paging indication bit index of a paging indication bit corresponding to the paging group ID of the UE in a PEI; and a first processing module 120, configured to decode the paging indication bit corresponding to the paging group ID of the UE in the PEI according to the paging indication bit index.

In an embodiment, the first determining module 110 is further configured to:

determine an intra-group index of a first type of paging group of the UE according to a preset correspondence between a paging group ID of the first type of paging group and the intra-group index of the first type of paging group, and the paging group ID of the first type of paging group of the UE; and determine the paging indication bit index according to the intra-group index of the first type of paging group of the UE.

In an embodiment, the first determining module 110 is further configured to:

determine the intra-group index of the first type of paging group of the UE as the paging indication bit index; or determine the paging indication bit index according to the intra-group index of the first type of paging group of the UE and an offset corresponding to the first type of paging group.

In an embodiment, in response to the PEI including a paging indication bit corresponding to the first type of paging group and a paging indication bit corresponding to a preset type of paging group, the offset is a number of paging groups of the preset type of paging group.

In an embodiment, in response to the PEI including a paging indication bit corresponding to the first type of paging group and a paging indication bit corresponding to a preset type of paging group, the offset is 0.

In an embodiment, the preset correspondence includes:

the intra-group index of the first type of paging group being the paging group ID of the first type of paging group.

In an embodiment, the preset correspondence includes:

within the first type of paging group, one paging group ID corresponds to one intra-group index;

or within the first type of paging group, a plurality of paging group IDs correspond to one intra-group index.

Figure 10:
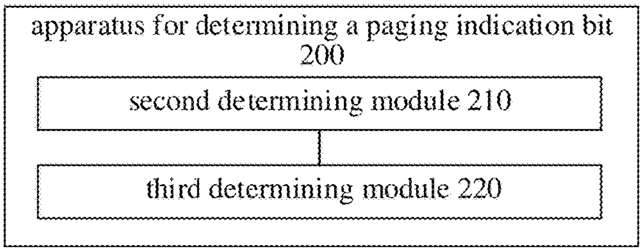
FIG. 10 is a block diagram of an apparatus for determining a paging indication bit according to an exemplary embodiment.

Embodiments of the disclosure further provide an apparatus for determining a paging indication bit. As illustrated in FIG. 10, the apparatus is applied to a base station in cellular mobile wireless communication. The apparatus 200 includes:

a second determining module 210, configured to determine, according to a paging group ID of a UE for which paging indication is to be performed, a paging indication bit index of a paging indication bit corresponding to the paging group ID of the UE; and a third determining module 220, configured to determine the paging indication bit corresponding to the paging group ID of the UE in a PEI according to the paging indication bit index.

In an embodiment, the second determining module 210 is further configured to:

determine an intra-group index of a first type of paging group of the UE according to a preset correspondence between a paging group ID of the first type of paging group and the intra-group index of the first type of paging group, and the paging group ID of the first type of paging group of the UE; and determine the paging indication bit index according to the intra-group index of the first type of paging group of the UE.

In an embodiment, the second determining module 210 is further configured to:

determine the intra-group index of the first type of paging group of the UE as the paging indication bit index; or determine the paging indication bit index according to the intra-group index of the first type of paging group of the UE and an offset corresponding to the first type of paging group.

In an embodiment, in response to the PEI including a paging indication bit corresponding to the first type of paging group and a paging indication bit corresponding to a preset type of paging group, the offset is a number of paging groups of the preset type of paging group.

In an embodiment, in response to the PEI including a paging indication bit corresponding to the first type of paging group and a paging indication bit corresponding to a preset type of paging group, the offset is 0.

In an embodiment, the preset correspondence includes:

the intra-group index of the first type of paging group being the paging group ID of the first type of paging group.

In an embodiment, the preset correspondence includes:

within the first type of paging group, one paging group ID corresponds to one intra-group index; or within the first type of paging group, a plurality of paging group IDs correspond to one intra-group index.

In an exemplary embodiment, the first determining module 110, the first processing module 120, the second determining module 210 and the third determining module 220, etc. may be implemented by one or more Central Processing Units (CPUs), Graphics Processing Units (GPUs), Baseband Processors (BP), Application Specific Integrated Circuits (ASICs), Digital Signal Processors (DSPs), Programmable Logic Devices (PLDs), Complex Programmable Logic Devices (CPLDs), Field-Programmable Gate Arrays (FPGAs), general processors, controllers, Micro Controller Units (MCUs), microprocessors or other electronic components, for implementing the above methods.

Figure 11:
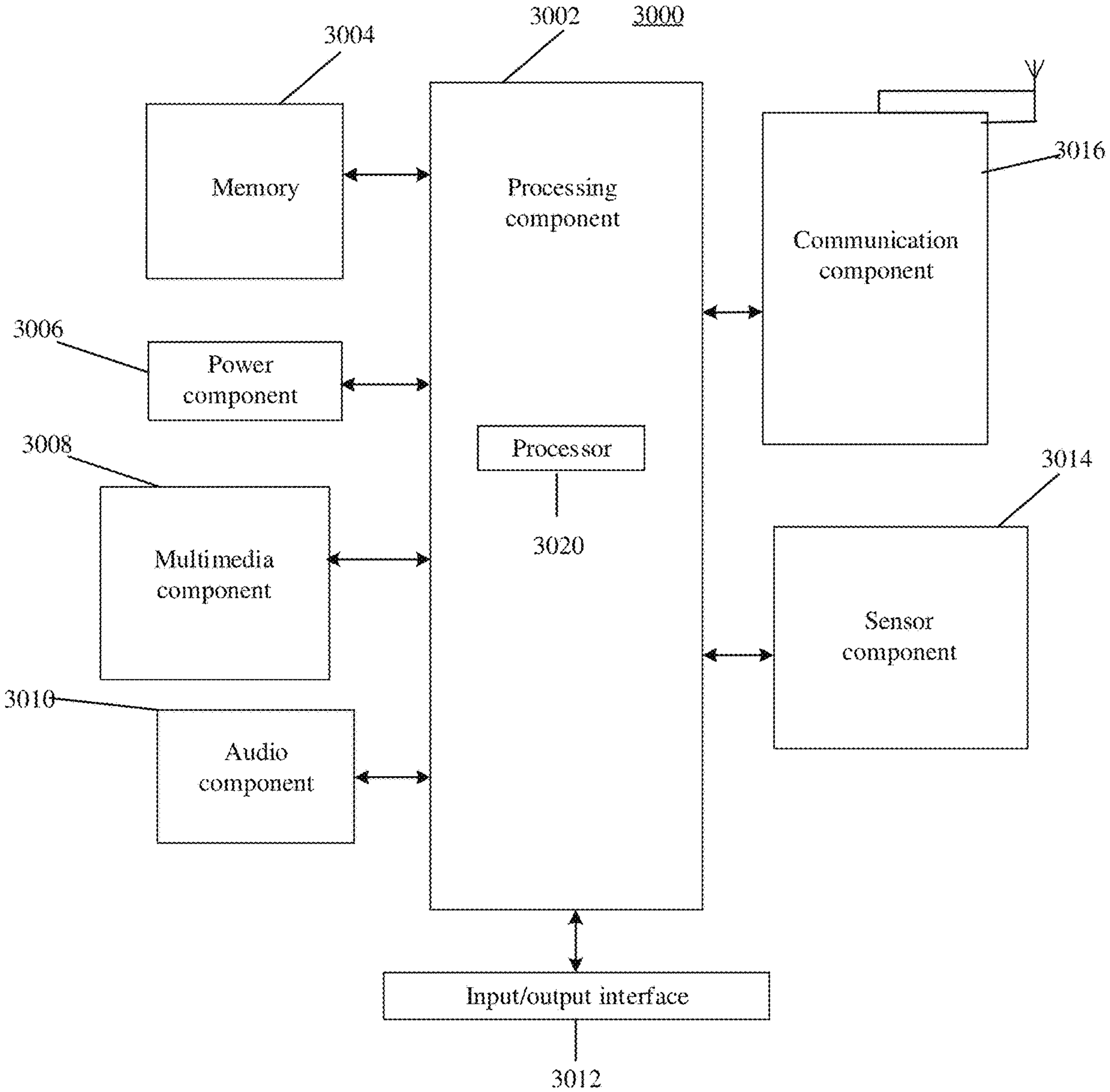
FIG. 11 is a block diagram of a device for determining a paging indication bit according to an exemplary embodiment.

FIG. 11 is a block diagram of a device 3000 for determining a paging indication bit according to an exemplary embodiment. For example, the device 3000 may be a mobile phone, a computer, a digital broadcasting terminal, a message transceiver device, a game console, a tablet device, a medical device, a fitness device and a personal digital assistant.

As illustrated in FIG. 11, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to implement all or part of the steps in the above described method. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a Complementary Metal Oxide Semiconductor (CMOS) or Charge-Coupled Device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as Wi-Fi, 2G or 3G, or a combination thereof. In an exemplary embodiment, the communication component 3016 receives a broadcast signal from an external broadcast management system or broadcast associated information via a broadcast channel. In an exemplary embodiment, the communication component 3016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 3000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In an exemplary embodiment, there is also provided a non-transitory computer readable storage medium including instructions, such as the memory 3004. The above instructions may be executed by the processor 3020 in the device 3000, for performing the above methods. For example, the non-transitory computer-readable storage medium may be a ROM, a Random Access Memory (RAM), a CD-ROM, a magnetic tape, a floppy disc, and an optical data storage device.

The embodiments of the disclosure provide a method for determining a paging indication bit, an apparatus for determining a paging indication bit, a communication device and a storage medium. The UE determines, according to the paging group ID of the UE, the paging indication bit index of the paging indication bit corresponding to the paging group ID of the UE in the PEI. The UE decodes the paging indication bit corresponding to the paging group ID of the UE in the PEI according to the paging indication bit index. In this way, the paging indication bit index corresponding to the paging group ID of the UE is determined based on the first correspondence between the paging group ID and the paging indication bit index, and then the paging indication bit corresponding to the paging group ID of the UE is determined. Therefore, the base station and the UE can accurately determine the paging indication bit of the UE, which avoids the situation of failing to accurately send a paging indication to the UE due to inconsistent identification of the paging indication bit of the UE between the base station and the UE, and improves the reliability of sending the paging indication to the UE through the paging indication bit in the PEI.

Other embodiments of the disclosure will be apparent to those skilled in the art from consideration of the specification and practice of the disclosure disclosed here. The disclosure is intended to cover any variations, uses, or adaptations of the embodiments of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining a paging indication bit, performed by a user equipment (UE), comprising:

determining, according to a paging group identifier (ID) of the UE, a paging indication bit index of a paging indication bit corresponding to the paging group ID of the UE in a paging early indication (PEI), wherein the PEI comprises paging occasion (PO) paging indication bits of one or more POs; and decoding the paging indication bit corresponding to the paging group ID of the UE in the PEI according to the paging indication bit index;

wherein determining, according to the paging group ID of the UE, the paging indication bit index of the paging indication bit corresponding to the paging group ID of the UE in the PEI, comprises:

in a case where a core network (CN) assigns the paging group ID of the UE, determining the paging group ID assigned by the core network as the paging indication bit index;

in a case of UE-ID based grouping, determining the paging indication bit index based on an intra-group index of a UE-ID based paging group of the UE and an offset corresponding to the UE-ID based paging group; wherein in response to the PEI including one or more paging indication bits corresponding to the UE-ID based paging group and one or more paging indication bits corresponding to a preset type of paging group, the offset is a number of paging groups of the preset type of paging group; wherein the preset type of paging group is a CN-assigned paging group.

2. The method of claim 1, further comprising:

in response to the UE being unable to determine a valid paging indication bit index (isg), not performing monitoring of paging indication bits in the PEI, and performing monitoring for each PO.

3. A non-transitory storage medium having an executable program stored thereon such that, when the program is executed by a processor, the method for determining a paging indication bit of claim 1 is implemented.

4. A method for determining a paging indication bit, performed by a base station, comprising:

determining, according to a paging group identifier (ID) of a user equipment (UE) for which paging indication is to be performed, a paging indication bit index of a paging indication bit corresponding to the paging group ID of the UE; and determining the paging indication bit corresponding to the paging group ID of the UE in a paging early indication (PEI) according to the paging indication bit index, wherein the PEI comprises paging occasion (PO) paging indication bits of one or more POs;

wherein determining, according to the paging group ID of the UE for which paging indication is to be performed, the paging indication bit index of the paging indication bit corresponding to the paging group ID of the UE comprising:

in a case where a core network (CN) assigns the paging group ID of the UE, determining the paging group ID assigned by the core network as the paging indication bit index;

in a case of UE-ID based grouping, determining the paging indication bit index based on an intra-group index of a UE-ID based paging group of the UE and an offset corresponding to the UE-ID based paging group; wherein in response to the PEI including one or more paging indication bits corresponding to the UE-ID based paging group and one or more paging indication bits corresponding to a preset type of paging group, the offset is a number of paging groups of the preset type of paging group; wherein the preset type of paging group is a CN-assigned paging group.

5. The method of claim 4, wherein in response to the UE being unable to determine a valid paging indication bit index (isg), monitoring of paging indication bits in the PEI is not performed, and monitoring is performed for each PO.

6. A communication device comprising:
a processor, and
a memory having an executable program executable by the processor stored thereon, wherein the processor is configured to perform the method of claim 4.

7. A non-transitory storage medium having an executable program stored thereon such that, when the program is executed by a processor, the method for determining a paging indication bit of claim 4 is implemented.

8. A communication device comprising:
a processor, and
a memory having an executable program executable by the processor stored thereon, wherein the processor is configured to:
determine, according to a paging group identifier (ID) of the UE, a paging indication bit index of a paging indication bit corresponding to the paging group ID of the UE in a paging early indication (PEI), wherein the PEI comprises paging occasion (PO) paging indication bits of one or more POs; and
decode the paging indication bit corresponding to the paging group ID of the UE in the PEI according to the paging indication bit index;
wherein the processor is configured to determine, according to the paging group ID of the UE, the paging indication bit index of the paging indication bit corresponding to the paging group ID of the UE in the PEI by:
in a case where a core network (CN) assigns the paging group ID of the UE, determining the paging group ID assigned by the core network as the paging indication bit index;
in a case of UE-ID based grouping, determining the paging indication bit index based on an intra-group index of a UE-ID based paging group of the UE and an offset corresponding to the UE-ID based paging group;
wherein in response to the PEI including one or more paging indication bits corresponding to the UE-ID based paging group and one or more paging indication bits corresponding to a preset type of paging group, the offset is a number of paging groups of the preset type of paging group; wherein the preset type of paging group is a CN-assigned paging group.

9. The communication device of claim 8, wherein,
the processor is further configured to in response to the UE being unable to determine a valid paging indication bit index (isg), not perform monitoring of paging indication bits in the PEI, and perform monitoring for each PQ.

* * * * *